June 7, 1927.
C. E. RODERICK
BLOOD TESTING DEVICE
Filed April 20, 1925
1,631,553
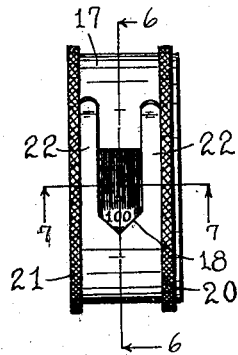
Fig. IV.
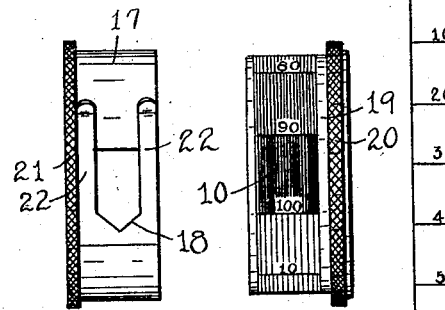
Fig. V.
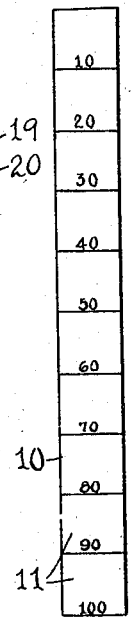
Fig. VIII.
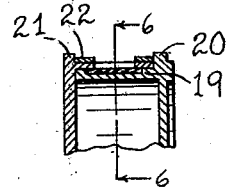
Fig. VII.
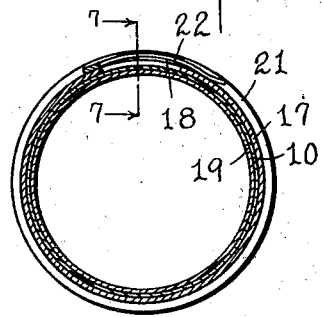
Fig. VI.
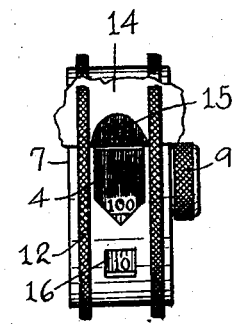
Fig. I.
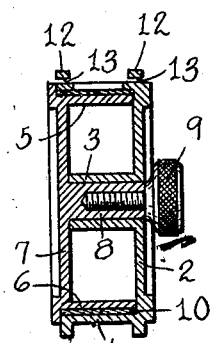
Fig. II.
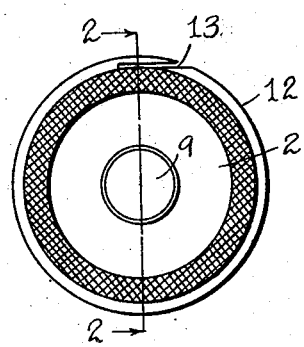
Fig. III.
INVENTOR
Charles E. Roderick
BY Chappell Earl
ATTORNEYS Patented June 7, 1927.

1,631,553

UNITED STATES PATENT OFFICE.

CHARLES E. RODERICK, OF BATTLE CREEK, MICHIGAN.

BLOOD-TESTING DEVICE.

Application filed April 20, 1925. Serial No. 24,569.

This invention relates to improvements in blood testing devices.

The main object of this invention is to provide a blood testing device which greatly facilitates the testing or estimating of the percentage of hemoglobin in the blood.

A further object of the invention is to provide a device of the class described which is very compact and may be repeatedly used, the gauge or scale indicia being effectively protected.

Objects pertaining to details and economies of my invention will definitely appear from the detailed description to follow.

I accomplish the objects of my invention by the devices and means described in the following specification. The invention is clearly defined and pointed out in the claims.

A structure which embodies the features of my invention is clearly illustrated in the accompanying drawing forming a part of this application, in which:

Fig. I is a front view of my improved blood testing device with a specimen mounted therein.

Fig. II is a section on a line corresponding to line 2—2 of Fig. III.

Fig. III is an end view looking from the right of Figs. I and II.

Fig. IV is a front elevation of a modified form or embodiment of my invention.

Fig. V is a front view of the casing and drum of the embodiment shown in Fig. IV disassembled.

Fig. VI is a section on a line corresponding to line 6—6 of Figs. IV and VII.

Fig. VII is a detail section on a line corresponding to line 7—7 of Figs. IV and VI.

Fig. VIII is a plan view of the gauge strip extended, no attempt being made to show the color scale.

In the drawing the sectional views are taken looking in the direction of the little arrows at the ends of the section lines and similar numerals of reference indicate similar parts throughout the several views.

My invention as shown in Figs. I, II and III comprises a cylindrical casing member 1 having an end wall 2 provided with a hub 3. This casing has a sight opening 4, preferably V shaped at its lower end. Rotatably mounted within this casing is a drum 5 having a peripheral channel 6. This drum has an end 7 carrying the spindle 8 disposed within the hub 3. The knurled finger piece 9 is threaded into the hub acting as a retaining means and also as a means for rotating the drum.

A gauge strip 10 is arranged within the channel of the drum and is provided with a series of colored portions 11 of different shades of red corresponding to the percentages of hemoglobin in the blood, there being ten sections in the strip illustrated, the percentages being from ten to one hundred. The different shades are indicated in Fig. V, no attempt, however, being made to indicate the shades in Fig. VIII.

In the embodiment shown in Figs. I–III the casing is provided with peripheral ribs 12 which are preferably knurled as indicated so that they provide effective hand holds for the casing. These ribs have slots 13 disposed tangentially and adjacent to the side opening providing a specimen holder.

In practice a drop of blood to be tested is taken up by a piece of absorbent paper 14 of such dimensions as to be slipped into the holder with the blood as indicated at 15 adjacent the side opening. By rotating the drum the indicia on the gauge strip may be successively brought into register with the side opening in convenient position for comparison with the specimen as indicated in Fig. I.

The casing also is preferably provided with an opening 16 adjacent the side opening and spaced therefrom so that the percentage indicia of the adjacent color section is visible therein, thereby indicating to the user the direction in which the drum should be rotated for higher or lower percentages.

In the embodiments shown in Figs. IV to VI, the casing 17 has a side opening 18 therein corresponding to the side opening 4. The drum 19 is rotated by means of the knurled rib 20, the casing being grasped by the knurled rib 21. Spring fingers 22 are mounted on the casing to provide a specimen holder, these fingers being arranged so that the specimen may be supported partially over the side opening. The operation is substantially the same as in the embodiment shown in Figs. I, II and III.

My improved blood testing device is very compact, the gauge strips are effectively protected, and the device may be repeatedly used.

Having thus described my invention, what I claim as new and desire to secure by Letters Patent is:

1. In a device of the class described, the combination of a pair of telescoped cylindrical members having end walls, the inner member being rotatable within the outer and provided with a peripheral channel, the outer member being provided with peripheral ribs having tangentially disposed slots therein providing a holder, said outer member having a sight opening between said ribs with one end adjacent the said holder whereby a specimen is supported by the holder at the end of the sight opening, and a gauge strip having a series of color sections with percentage indicia associated therewith mounted in said channel whereby the color sections may be successively brought into register with said sight opening for comparison with the specimen supported in said holder.

2. In a device of the class described, the combination of a pair of telescoped cylindrical members having end walls, the inner member being rotatable within the outer, the outer member being provided with a specimen holder, said outer member having a sight opening adjacent the said holder, and a gauge strip having a series of color sections with percentage indicia associated therewith mounted on said inner member whereby the color sections may be successively brought into register with said sight opening for comparison with the specimen supported in said holder.

3. In a device of the class described, the combination of a pair of telescoped cylindrical members, the inner member being rotatable within the outer, the outer member being provided with peripheral ribs having tangentially disposed slots therein providing a holder, said outer member having a sight opening between said ribs with one end adjacent the said holder whereby a specimen is supported by the holder at the end of the sight opening, and a gauge strip mounted on said holder, all coacting for the purpose specified.

4. In a device of the class described, the combination of a cylindrical casing member having a peripheral sight opening therein and an end wall provided with a central hub, a drum rotatable within said casing provided with an end wall having a spindle disposed in said hub, a finger piece on said spindle for rotatably adjusting said drum, and a gauge strip mounted on the periphery of said drum whereby the indicia thereof may be brought into register with said opening, said casing being provided with peripherally disposed fingers providing a specimen holder at one end of said opening, facilitating the comparison of the specimen with said gauge strip.

5. In a device of the class described, the combination of a cylindrical casing member having a peripheral sight opening therein and an end wall provided with a central hub, a drum rotatable within said casing provided with an end wall having a spindle disposed in said hub, a finger piece on said spindle for rotatably adjusting said drum, and a gauge strip mounted on the periphery of said drum whereby the indicia thereof may be brought into register with said opening.

In witness whereof I have hereunto set my hand.

CHARLES E. RODERICK.